Aug. 4, 1964  E. A. LAKIN  3,142,914
LAND LEVELING MACHINE
Filed Feb. 20, 1963  2 Sheets-Sheet 1
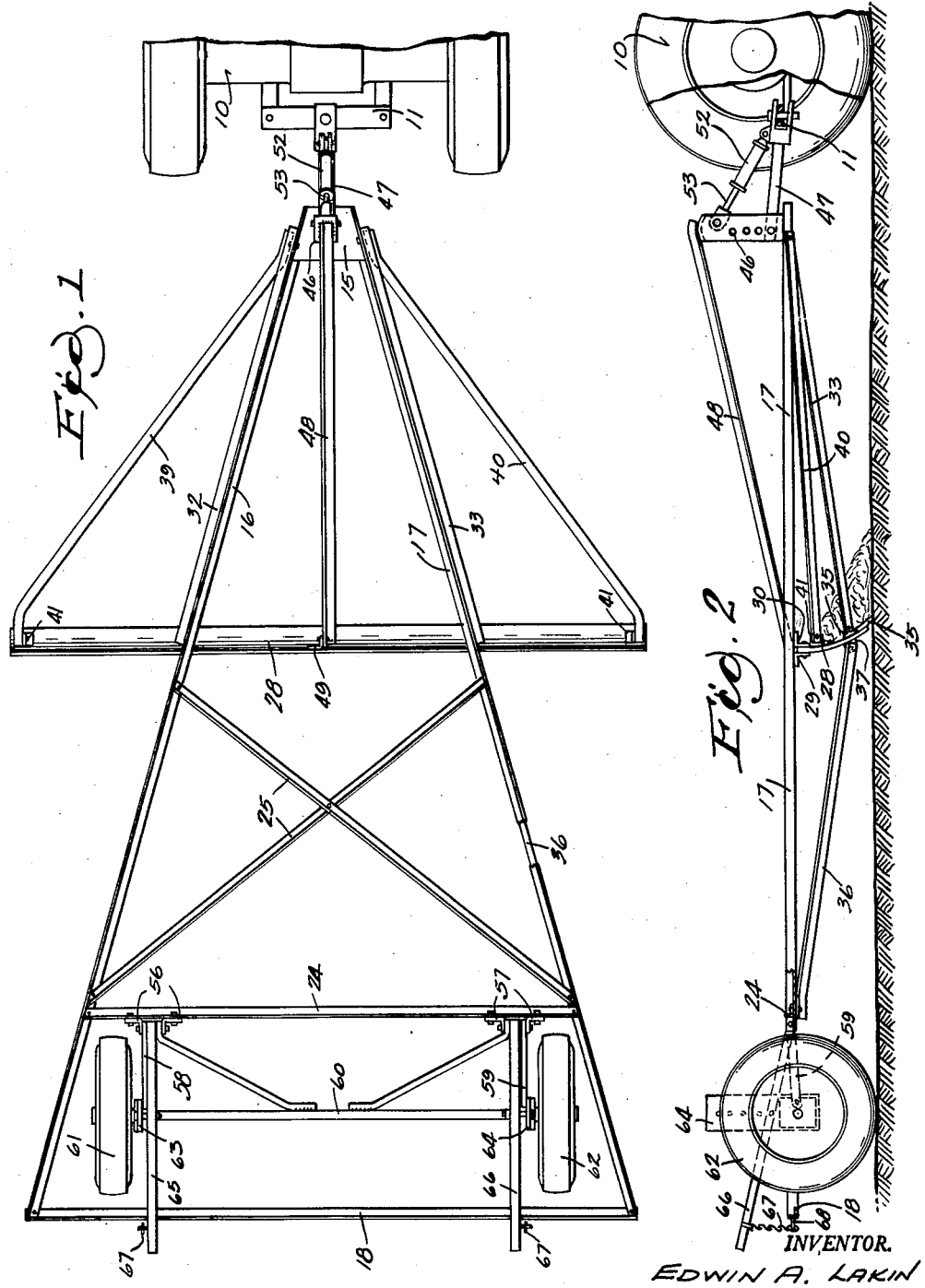
INVENTOR.
EDWIN A. LAKIN
BY
*Miles Henninger*
ATTORNEY Aug. 4, 1964  E. A. LAKIN  3,142,914
LAND LEVELING MACHINE
Filed Feb. 20, 1963  2 Sheets-Sheet 2
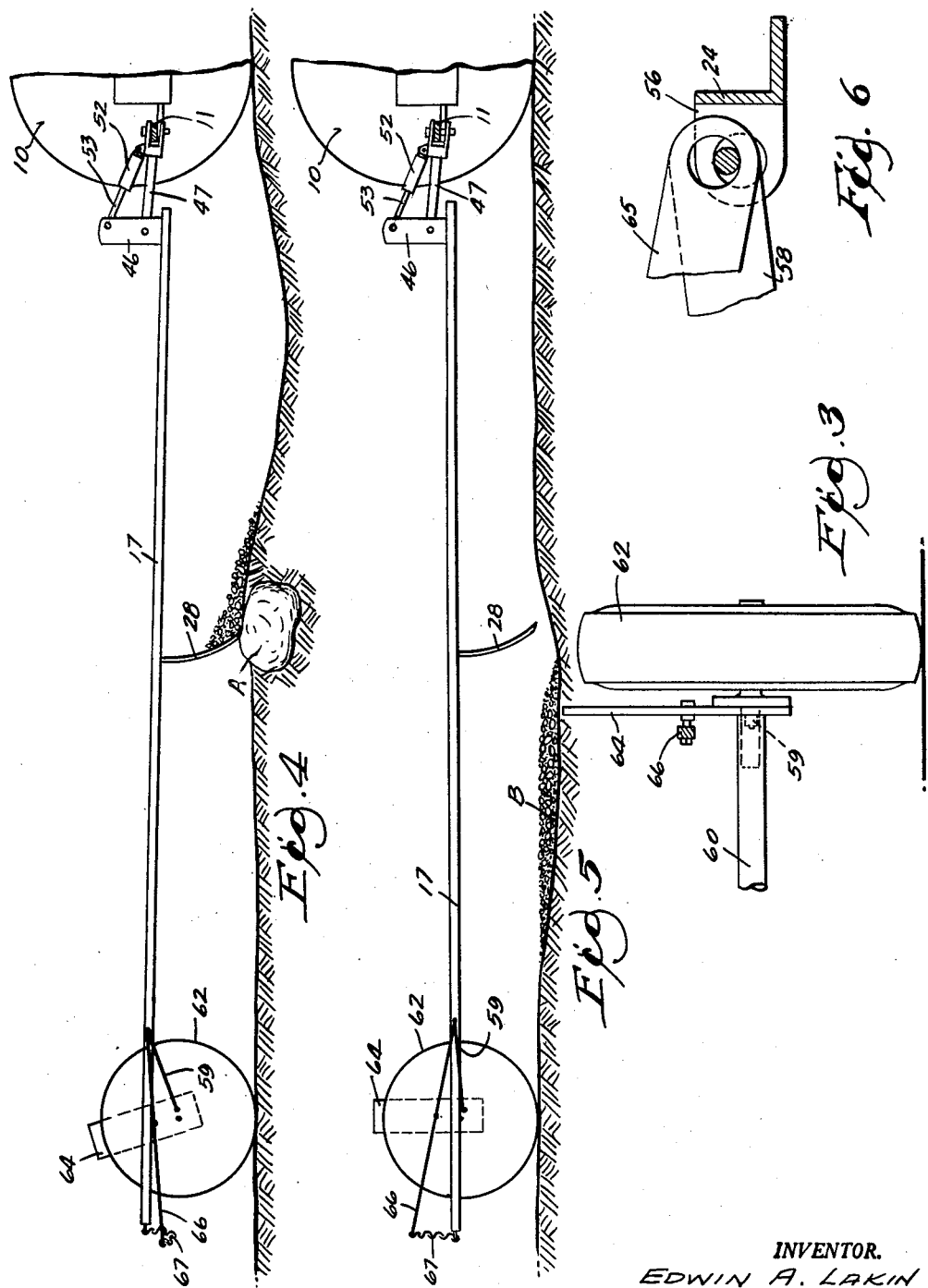
INVENTOR.
EDWIN A. LAKIN
BY Miles Henninger
ATTORNEY

United States Patent Office 3,142,914
Patented Aug. 4, 1964

3,142,914
LAND LEVELING MACHINE
Edwin A. Lakin, Mancos, Colo.
Filed Feb. 20, 1963, Ser. No. 259,913
3 Claims. (Cl. 37—169)

This invention relates to improvements in machines for leveling land and particularly to a machine specially adapted for use on farms when leveling or clod breaking or both are required, and the machine is to be handled by the usual wheeled type of farm tractor and on land varying from substantially level to steep slopes.

Agricultural land which is being cultivated for the first time or has not been cultivated for some time or which is very wet at times or on which the ground cover is killed in spots by frost or which is subject to other unusual conditions, tends to become very uneven and the unevenness is emphasized dependent on the length of time between cultivations.

When a tractor-drawn land cultivating machine is to be used to work such uneven ground, both the operation of the machine and the final condition of the land is unsatisfactory. A disk, plow or similar machine tends to cut too deeply into hummocks and to miss cutting or to cut very shallow in the hollows so that the load on the tractor is very variable. Cutting too deeply or not cutting deeply enough are both obviously unsatisfactory in preparing a seed bed or in planting seeds. Hence such land must be leveled before it can be satisfactorily worked by tractor-drawn cultivating equipment to produce a seed bed of uniform and predetermined depth.

Further, when land is worked under some soil conditions, the ground may remain in relatively large clods or lumps. It is then desired both to level the land and to reduce the surface layer to smaller particles into which seed may be placed at uniform depth and which will cover the seed completely and uniformly. A harrow may be used for breaking up clods and lumps but it cannot transport substantial amounts of ground from high spots to hollows for more than a very short distance. The present machine performs both leveling and ground breaking functions and leaves the ground in good condition for even the planting of grain with a drill or for use of any other kind of seed or planter.

The present invention provides a land leveling machine in which the frame is generally triangular. The blade in particular is braced at both its upper edge by attachment to various frame members and at its lower edge by special braces. The frame is much longer than the tractor furnishing the motive power and the blade is wider than the greatest frame width and is suspended from below the frame and at approximately midway between the ends of the frame to minimize the effect on the leveling machine of rocking and pitching of the tractor as it precedes the leveling machine over rough ground.

A pair of wheels on an axle is attached to the rearward portion of the frame to pivot vertically relative to the frame and also to tilt laterally (transversely of the frame) toward either side of the frame. Thus the wheel carriage controls the depth of blade cut, and also adjusts to a side hill slope so that the device can be used for terracing the land. The position of the wheel carriage is determined by arms pivoted at one end on the frame, each arm being adjustably set in vertical direction by a plate extending at right angles to the axle for thereby varying the vertical position of the axle relative to the frame. The arms are connected at the other end by chains with the rear of the frame so that upward movement of the carriage is limited.

The hitch for connecting the leveling machine to its tractor consists of a drawbar having considerable "play" as is usual so that it will not bind except under unusual circumstances. The usual hydraulic lift also forms part of the hitch so that the leveler may be raised or lowered as permitted by the drawbar. Thus the forward end of the frame may be kept at approximately the same height from the ground surface regardless of the tractor used and only adjustments of the carriage are needed to control the depth of the cut.

In the drawings:

FIG. 1 is a top plan view of the present machine, showing its connection to a farm-type wheeled tractor.

FIG. 2 is a side elevation of the device of FIG. 1.

FIG. 3 is a fragmentary view of an axle and one of the wheels thereon, and of the parts directly associated with the axle and wheel.

FIG. 4 diagrammatically illustrates the position of the carriage when the blade rides up and over a rock or the like, and FIG. 5 diagrammatically illustrates the carriage position when a hummock has been cut away and distributed into an adjacent hollow.

FIG. 6 is an enlarged fragmentary section view showing the relationship of the undersize pivot connections between the carriage and main frame.

Referring to the drawing by numerals, 10 and 11 respectively indicate the tractor and its drawbar, by which the present land leveler is to be pulled. Generally, the leveler includes a frame carrying a blade, means for adjustably connecting the forward frame portion to the tractor drawbar to keep the forward frame portion a given distance from the ground level, and an adjustable wheeled carriage at the rear portion of the frame for carrying a part of the leveler as it is drawn over the ground by the tractor and for controlling depth of cut by the blade.

The frame is substantially triangular and includes a front plate 15 to which are attached diverging side rails 16 and 17 joined at the rearward end by a cross bar 18 to complete the frame outer part. A cross bar 24 and the end bar 18 form a set of cross braces which are relatively closely spaced at the rearward end of the frame. The space just forward of cross bar 24 is provided with two diagonal braces 25 so that the frame is effectively cross braced just back of a blade 28 where most of the twisting force occurs along its axial frame length. The combination of braces at right angles to the axis of the frame and diagonally thereto provides adequate bracing in each direction with the minimum of material. The frame is preferably approximately two times the length of the tractor pulling the device, for a purpose which will appear hereinafter.

The blade 28 is transversely curved and extends across and beyond both sides of the frame and preferably for distances slightly beyond the widest dimensions of the frame. The blade is at right angles to the longitudinal axis of the frame and is mounted on bracket angles 29 and 30 attached to and extending downwardly from the several frame side rails 16 and 17. The blade is braced by bars 32, 33 from adjacent to the front plate 15 to the forward face of the blade where such braces are attached by brackets 34. The blade 28 preferably has a strip 35 attached along the lower edge to serve as a wear strip to be sharpened as necessary and to be readily replaced. Braces 36 extend from adjacent the rearward cross brace 24 forwardly and downwardly to the rear face of blade 28 where they are also attached by brackets 37. Bars 39, 40 also extend from the front plate 15 to the ends of blade 28 and are attached thereto by brackets 41, to serve also as braces but their chief function is to guide standing objects away from the blade and to avoid hooking ends of the blade on such objects. Thus the blade is supported in various directions by four members attached to its upper portion and two members attached adjacent the renewable edge strip, the members extending at various angles from the plate to the frame. The blade is mounted approximately midway between the ends of the frame which, in combination with the greater length of the frame as compared to the tractor length, practically neutralizes the effect on the blade, of pitching and rolling of the tractor as it moves over rough ground.

The forward end of the frame bears a hitch linkage which includes a post 46 extending upwardly from the plate 15 for pivoting thereon of a drawbar 47 which has its forward end fashioned somewhat like a clevis to receive an end of the drawbar 11 of the tractor. The upper end of post 46 is braced by a member 48 extending backwardly and downwardly to the blade 28 where it is attached by bracket 49. The usual hydraulic lift cylinder 52 is pivotally attached at one end to the top of the clevis of drawbar 47 and prevents bending of such clevis, and the rod 53 of the hydraulic lift piston is attached to the hitch post 46. As usual, the hydraulic lift receives liquid under pressure from a pump on the tractor to raise the forward end of the frame to the limit of the play in the drawbar, or farther if the drawbar is released. The hitch linkage thus provides means whereby the vertical elevation of the forward end of the linkage may be varied to accommodate to the highest tractor drawbar normally in use, and which prevents failure of the drawbar clevis.

The rear cross bar 24 is provided with pairs of spaced brackets 56 and 57 in which are pivoted wheel axle supports 58 and 59 attached to a wheel axle 60 having a pair of wheels 61, 62 rotatable on the axle ends. The axle also has fixed thereto plates 63 and 64, of which one is adjacent each wheel to extend upwardly from the axle, and such plates are provided with a series of holes longitudinally of the plates. Arms 65 and 66 are severally mounted on the pins on which the wheel supports 58, 59 are pivoted. A chain 67 is attached to the free end of each of the arms 65 and 66 and is hooked to projections 68 on the cross bar 18 to limit movement of the carriage in one direction. The above parts form a carriage of which the axle 60 may swing vertically in an arc about the pivots in brackets 56, 57 dependent on where the arms 65, 66 are attached to their respective plates 63, 64 as by bolts or the like. Thus the relationship of the carriage 60–66 to the frame and the height of the rear of the frame from the ground may be varied. The pivots in the brackets 56, 57 are made substantially undersize for the holes in which they are placed so that the carriage may assume considerable angles transversely of the frame when one wheel rolls over an obstruction.

In practice the side rails of the leveler have been made approximately twenty feet long. The position of the carriage is set relative to the frame so that the blade will engage only hummocks above the general land level. The cut-off material is substantially all retained on and tends to spread towards the ends of the blade so that it may be spread in a relatively thin layer into the hollow at B as shown in FIG. 5. Because of the unusual length of the frame and the position of the blade thereon, the blade is a considerable distance from the hummock that has just been cut, at the time the ground wheels roll over the site of the former hummock.

When the blade strikes a rock and must ride up and over the rock as indicated at A in FIG. 4, the blade lifts the frame rather than pulling down on the frame as is usual. The carriage however continues to roll on the ground surface so that the carriage drops relative to the frame. Because there is not force bearing down on the carriage from the frame, the chains 67 become slack as shown in FIG. 4. But when the blade runs off the rock, it will again cut into the ground and pull down on the frame so that the carriage again assumes the position of FIG. 5 and chains 67 become taut.

The frame is especially lightweight and simple so that it is easily used and maintained. If there is any indication that particular work requires additional bracing of the machine, there is ample space for placing more bracing wherever needed on the frame. The proportions of the frame and of the blade reduce the effect of tractor rolling and pitching on the leveling machine and secure wide spreading of the cut-off material. Lateral tilting of the carriage adapts the machine to any degree of slope found in lands under cultivation. The hitch adjusts to any drawbar height and the carriage is the sole means for controlling depth of cut. Even with the above advantages, the present machine is cheaper than any other leveling device on the market.

I claim:

1. In a tractor-drawn land leveling machine a substantially triangular frame having cross members, a blade fixed to the frame at substantially a right angle to the longitudinal axis of the frame and extending downwardly therefrom, an adjustable hitch on the forward end of the frame for connection with a tractor to maintain the forward frame end in given relation to the land to be levelled, a carriage automatically movable relative to the frame upon change of level of the frame and comprising wheels on an axle pivotally connected by pairs of supports and arms to a pair of brackets on the frame, said connection of said pairs of supports and arms to said brackets being on a common pivot, said pivots being undersize relative to the holes in said brackets for permitting tilting of the carriage transversely of the frame as a wheel rolls over an obstruction higher than ground level at the other wheel, said arms being adjustably connected intermediate the ends thereof to the carriage axle and extending over a frame cross member, and flexible means adjustably connecting the ends of the arms with the frame, the ends of the arms limiting carriage movement in one direction and the flexible means limiting movement in another direction relative to the frame.

2. The machine of claim 1 in which the flexible means are chains severally and adjustably connecting the ends of the arms with the frame, the chains being drawn taut while the carriage supports the frame and being slack when the blade tends to support the frame.

3. The machine of claim 1 in which plates are fixed on the axle to extend radially of the wheels in upward direction and in which the adjustable connection is between intermediate portions of the arms and said plates for varying the amount of carriage movement downwardly relative to the frame.

References Cited in the file of this patent

UNITED STATES PATENTS

| | | |
|---|---|---|
| 1,547,139 | Snyder | July 21, 1925 |
| 2,051,283 | Austin | Aug. 18, 1936 |
| 2,141,690 | Glenn | Dec. 27, 1938 |
| 2,284,550 | Adams | May 26, 1942 |
| 2,567,805 | Doerfler | Sept. 11, 1951 |
| 2,635,888 | Bailiff | Apr. 21, 1953 |
| 2,722,067 | Baron | Nov. 1, 1955 |